April 1, 1930. C. R. BOGGS 1,752,974

CABLE

Filed Dec. 27, 1928

INVENTOR
Charles R. Boggs
BY
Pennie, Davis, Marvin & Edmonds
ATTORNEYS

Patented Apr. 1, 1930

1,752,974

UNITED STATES PATENT OFFICE

CHARLES R. BOGGS, OF WABAN, MASSACHUSETTS, ASSIGNOR TO SIMPLEX WIRE AND CABLE COMPANY, OF BOSTON, MASSACHUSETTS, A CORPORATION OF MASSACHUSETTS

CABLE

Application filed December 27, 1928. Serial No. 328,741.

This invention relates to conductor cables of the armored type and is concerned more particularly with an armored cable especially adapted for underground work. In the novel cable, an armor is employed which provides a high degree of protection and affords complete coverage, this armor, however, being entirely non-metallic so that it is non-inductive, not subject to deterioration from rusting, and less expensive than metal armor frequently used for that purpose.

The new cable includes one or more conductors covered with any suitable insulating material and enclosed in a protective armor preferably taking the form of a fibre tape wrapped helically about the conductors with the turns partially overlapping so that the coverage is complete. This tape may be impregnated with any suitable protective compound or may be hard vulcanized fibre, the tape preferably being subjected to a forming operation while or before it is laid in place so that the convolutions will lie snugly in the desired overlapping relation. Over the armor so provided may be placed a protective covering such as a jute serve or a wrapping of asphalted tape.

For a better understanding of this invention, reference may be had to the accompanying drawing, in which Fig. 1 is a view in side elevation of a piece of the cable with the various layers broken away;

Figure 1:
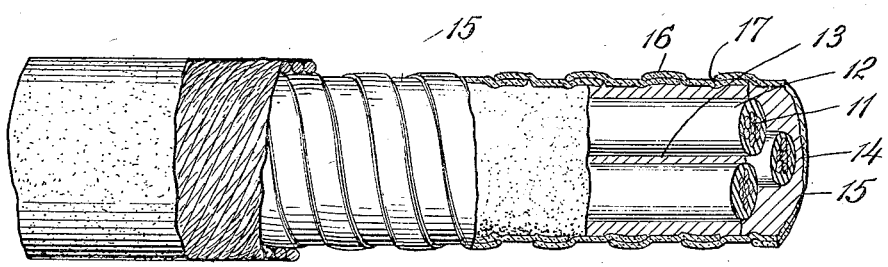
Figure 2:
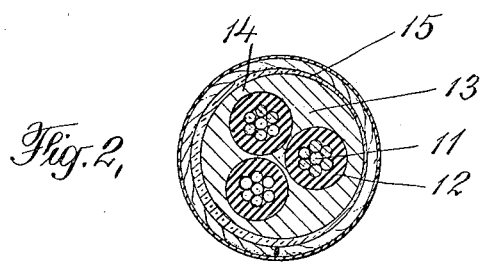
Fig. 2 is a transverse section.
Figure 3:
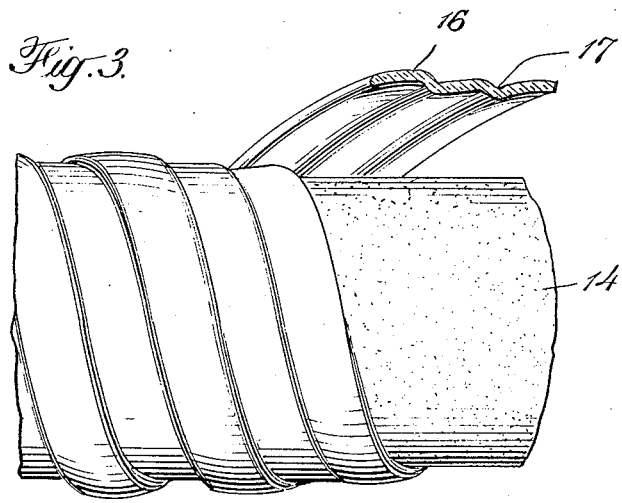
Fig. 3 is an enlarged view showing the manner of wrapping the armor.

The cable illustrated is of the multiple conductor type and includes three conductors, though it is to be understood that the principles of the invention may be employed in a cable having one or any convenient number of conductors. Each conductor 10 is made up of a plurality of metal wires or strands 11 enclosed in insulation 12 which may conveniently take the form of a coating of rubber of suitable thickness. These conductors are preferably twisted about one another in the usual way and the space between adjacent conductors may be filled or not, as may be desired. If a filling is used as indicated at 13, this filling may take the form of dry or saturated jute or any similar material used for that purpose. In some instances, as, for example, in the cable illustrated, the filling material extends beyond the outer surface of each conductor as indicated at 14, thus serving as a bedding for the armor.

The armor layer 15 is made of non-metallic material and for this purpose, I prefer to employ a fibre tape which may be used with or without impregnation. A hard vulcanized fibre material may similarly be used. This tape is preferably subjected to a forming operation carried on by mechanism forming a part of the machine by which it is wound in place or the tape may be given the proper shape before being placed in the winding machine. In the forming operation, the flat tape is given a bulge or crown 16 extending longitudinally along one edge and this crown, for example, may be about one-third the width of the tape. The tape may also be indented or creased lengthwise, as indicated at 17, the tape being divided into thirds by the inner edge of the crown and by the indentation.

In applying the tape, it is wound helically about the conductors, the crown on one convolution overlying that portion of the next convolution defined by the edge of the tape and the indentation 17. When thus wrapped, the tape lies snugly in place providing complete coverage and an abrasion-resisting armor which affords substantial protection. The cable may now be completed in any desired manner, as, for example, by a jute serve laid over the armor or asphalted tape may be used in place of the serve. In the tape illustrated, the armor is bedded upon the filling material of jute, but it will be understood that other types of bedding may be employed as well as other types of protective material over the armor.

A cable constructed in the manner described affords substantially the same protection as steel-taped cables but is less expensive and does not deteriorate due to rusting. This cable, therefore, is particularly desirable in place of steel-armored tubes for underground work. This cable is sufficiently flexible for ordinary purposes regardless of whether the tape used is of dry or saturated fibre, and hard vulcanized fibre wrapped in the manner described does not reduce the flexibility of the cable to a detrimental degree.

I claim:

1. A cable which comprises the combination of an insulated conductor, an armor enclosing the conductor and made up of a non-metallic strip wound helically about the conductor and with the convolutions overlapping.

2. A cable which comprises an insulated conductor, a non-metallic armor tape wound helically about the conductor with the convolutions thereof overlapping, the tape having a crown extending lengthwise along one edge, the crowned portion of each convolution overlying a portion of the adjacent convolution.

3. A cable which comprises an insulated conductor, an armor enclosing the conductor and made up of convolutions of non-metallic tape formed with a crown of less width than the tape extending along one edge thereof, the crowned portion of one convolution overlying the adjacent convolution, the portion so overlain being in part defined by an indentation extending lengthwise of the tape.

4. A cable which comprises an insulated conductor, a saturated fibre armor tape formed with a crown of less width than the tape extending along one edge thereof, this tape being wrapped about the conductor with the crowned portion of each convolution overlying a part of the adjacent convolution.

5. A cable which comprises an insulated conductor, a bedding about the conductor, an armor on the bedding made up of overlapping convolutions of non-metallic tape, and a protective covering over the armor.

In testimony whereof I affix my signature.

CHARLES R. BOGGS.

DISCLAIMER 1,752,974.—*Charles R. Boggs*, Waban, Mass. CABLE. Patent dated April 1, 1930. Disclaimer filed December 6, 1930, by the assignee, *Simplex Wire and Cable Company*.

Hereby enters the following disclaimer, to wit:

A. Your petitioner disclaims from claim 1 of said Letters Patent all cable except cable in which the "non-metallic strip" comprising the "armor" is hard vulcanized fibre or, with respect to the quality of hardness, the equivalent of hard vulcanized fibre.

B. Your petitioner disclaims from claim 5 of said Letters Patent all cable except cable in which the "non-metallic tape" comprising the "armor" is hard vulcanized fibre or, with respect to the quality of hardness, the equivalent of hard vulcanized fibre.

[*Official Gazette December 23, 1930.*]